United States Patent
Ghazal et al.

(10) Patent No.: US 6,505,188 B1
(45) Date of Patent: Jan. 7, 2003

(54) VIRTUAL JOIN INDEX FOR RELATIONAL DATABASES

(75) Inventors: Ahmad Said Ghazal, Redondo Beach, CA (US); Paul Laurence Sinclair, Manhattan Beach, CA (US); Chi Kim Hoang, Palo Alto, CA (US)

(73) Assignee: NCR Corporation, Dayton, OH (US)

( * ) Notice: Subject to any disclaimer, the term of this patent is extended or adjusted under 35 U.S.C. 154(b) by 346 days.

(21) Appl. No.: 09/594,963

(22) Filed: Jun. 15, 2000

(51) Int. Cl.[7] .............................................. G06F 17/30
(52) U.S. Cl. ........................................................ 707/2
(58) Field of Search ............................. 707/3, 2, 4, 203

(56) References Cited

U.S. PATENT DOCUMENTS

| | | | |
|---|---|---|---|
| 5,241,648 A | | 8/1993 | Cheng et al. ................... 707/7 |
| 5,440,730 A | * | 8/1995 | Elmasri et al. ............. 707/203 |
| 5,666,525 A | | 9/1997 | Ross .............................. 707/2 |
| 5,710,915 A | * | 1/1998 | McElhiney .................... 707/3 |
| 5,870,747 A | | 2/1999 | Sundaresan ................. 707/101 |
| 5,983,215 A | | 11/1999 | Ross et al. ..................... 707/2 |
| 5,987,453 A | | 11/1999 | Krishna et al. ................ 707/4 |
| 6,289,334 B1 | * | 9/2001 | Reiner et al. .................. 707/3 |

OTHER PUBLICATIONS

A. Witkowski et al. "NCR 3700—The Next–Generation Industrial Database Computer," Proceeding of the 19th VLDB Conference, Dublin, Ireland, 1993, 14 pgs.

* cited by examiner

Primary Examiner—Diane D. Mizrahi
(74) Attorney, Agent, or Firm—Gates & Cooper

(57) ABSTRACT

The retrieval of data from a database in a computerized database management system is optimized through the use of a virtual join index and associated covering non-unique secondary indexes. The virtual join index is created by combining one or more commonly-used columns of one or more tables. The covering non-unique secondary indexes are generating by combining one or more commonly-used columns of the virtual join index. Data is not stored in the virtual join index after the covering non-unique secondary indexes are generated. Thereafter, some queries or portions thereof may be resolved solely by accessing one or more of the covering non-unique secondary indexes.

77 Claims, 4 Drawing Sheets

200 (CUSTOMER_TABLE)

| CUSTKEY | NAME | ADDRESS | STATE |
|---|---|---|---|
| 100 | LOUIS | SAN DIEGO | CA |
| 101 | CHI | PALO ALTO | CA |
| 102 | RICK | EL SEGUNDO | CA |

202 (ORDER_TABLE)

| ORDERKEY | ORDER STATUS | ORDER DATE | PRICE | CUSTKEY |
|---|---|---|---|---|
| 5000 | PENDING | 1/1/2000 | $100 | 102 |
| 5001 | PENDING | 2/1/2000 | $200 | 100 |
| 5002 | PENDING | 3/1/2000 | $300 | 102 |

204 (VIRTUAL_JOIN_INDEX)

| CUSTKEY | NAME | ORDER STATUS | ORDER DATE |
|---|---|---|---|
| 102 | RICK | PENDING | 1/1/2000 |
| 100 | LOUIS | PENDING | 2/1/2000 |
| 102 | RICK | PENDING | 3/1/2000 |

206 (NUSI1)

| CUSTKEY | ORDER STATUS | ROW ID |
|---|---|---|
| 102 | PENDING | R1 |
| 100 | PENDING | R2 |
| 102 | PENDING | R3 |

208 (NUSI3)

| NAME | ORDER DATE | ROW ID |
|---|---|---|
| RICK | 1/1/2000 | R1 |
| LOUIS | 2/1/2000 | R2 |
| RICK | 3/1/2000 | R3 |

FIG. 2A

VIRTUAL JOIN INDEX FOR RELATIONAL DATABASES

CROSS REFERENCE TO RELATED APPLICATIONS

This application is related to the following co-pending and commonly-assigned patent application, which is incorporated by reference herein:

Application Ser. No. 09/073,113, entitled "A JOIN INDEX FOR RELATIONAL DATABASES", filed on May 5, 1998, by Chi Kim Hoang, and now U.S. Pat. No. 6,167,399, pending U.S. patent application Ser. No. 09/594,299, entitled "COMMON SPOOL FILES FOR MAINTAINING JOIN INDEXES", filed on same date herewith, by Grace K. Au and Chi Kim Hoang, and pending U.S. patent application Ser. No. 09/594,963, entitled "AGGREGATE JOIN INDEX FOR RELATIONAL DATABASES", filed on same date herewith, by Grace K. Au and Chi Kim Hoang.

BACKGROUND OF THE INVENTION

1. Field of the Invention

This invention relates in general to computerized relational databases, and in particular, to a virtual join index and associated covering non-unique secondary indexes.

2. Description of Related Art

Relational DataBase Management Systems (RDBMS) using a Structured Query Language (SQL) interface are well known in the art. The SQL interface has evolved into a standard language for RDBMS software and has been adopted as such by both the American National Standards Institute (ANSI) and the International Standards Organization (ISO).

In an RDBMS, all data is externally structured into tables. A table in a relational database is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

The SQL interface allows users to formulate relational operations on the tables. One of the most common SQL queries executed by the RDBMS is the SELECT statement. In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required.

Generally, the result of a SELECT statement is a subset of data retrieved by the RDBMS from one or more existing tables stored in the relational database, wherein the FROM clause identifies the name of the table or tables from which data is being selected. The subset of data is treated as a new table, termed the result table.

A join operation is usually implied by naming more than one table in the FROM clause of a SELECT statement. A join operation makes it possible to combine tables by combining rows from one table with another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

Join indexes have been used to improve the performance of join operations in an RDBMS. A description of join indexes, including a novel join index, can be found in co-pending and commonly-assigned Application Ser. No. 09/073,113, filed on May 5, 1998, by Chi Kim Hoang, entitled "A JOIN INDEX FOR RELATIONAL DATABASES", and now U.S. Pat. No. 6,167,399, which application is incorporated by reference herein.

Moreover, techniques have been developed for maximizing performance using join indexes. However, there remains a need in the art for additional optimization techniques through the use of join indexes.

SUMMARY OF THE INVENTION

To overcome the limitations in the prior art described above, and to overcome other limitations that will become apparent upon reading and understanding the present specification, the present invention discloses methods, apparatus, articles of manufacture, and data structures related to the creation and use of a virtual join index and associated covering non-unique secondary indexes. The virtual join index is created by combining one or more commonly-used columns of one or more tables. The covering non-unique secondary indexes are generating by combining one or more commonly-used columns of the virtual join index. Data stored in the virtual join index is discarded and not maintained after the covering non-unique secondary indexes are generated. Thereafter, some queries may be resolved solely by accessing one or more of the covering non-unique secondary indexes.

BRIEF DESCRIPTION OF THE DRAWINGS

Referring now to the drawings in which like reference numbers represent corresponding parts throughout:

FIGS. 2A and 2B illustrate the structure of two base tables, a virtual join index, and two covering non-unique secondary indexes according to the preferred embodiment of the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes virtual join indexes and associated covering non-unique secondary indexes, which provide dramatic performance improvements to queries that involve join operations. A virtual join index is a join index with one or more covering non-unique secondary indexes (NUSIs), for which the data of the virtual join index is discarded and not maintained after the NUSIs are created. For queries where at least a portion of the query can be resolved solely by accessing one of the covering NUSIs, a significant performance improvement may be obtained. In addition, the NUSIs may use a compressed format that reduces their storage requirements and provides faster access to the data therein.

Environment

Figure 1:
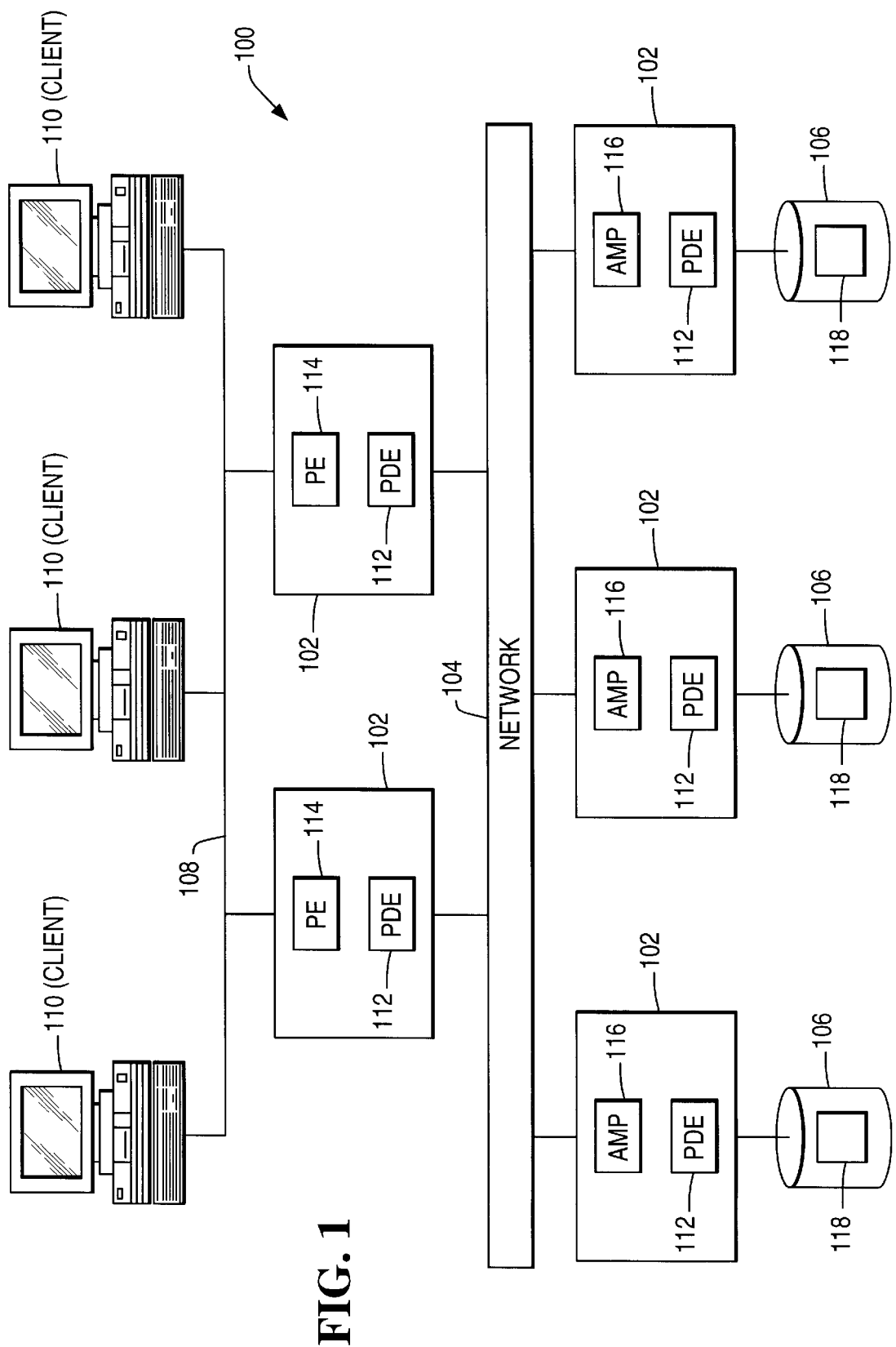
FIG. 1 illustrates an exemplary hardware and software environment according to the preferred embodiment of the present invention.

FIG. 1 illustrates an exemplary hardware and software environment that could be used with the preferred embodiment of the present invention. In the exemplary environment, a computer system 100 is comprised of one or more processing units (PUs), 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by a Relational DataBase Management System (RDBMS) executed by the system 100.

In the preferred embodiment of the present invention, the RDBMS comprises the Teradata® product offered by NCR Corporation, and includes one or more Parallel Database Extensions (PDEs) 112, Parsing Engines (PEs) 114, and Access Module Processors (AMPs) 116. These components of the RDBMS perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide a query or other unit of work into smaller sub-units, each of which can be assigned to an AMP 116. In the preferred embodiment, data partitioning and repartitioning may be performed, in order to enhance parallel processing across multiple AMPs 116. For example, the data may be hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records failing within a range of values, wherein the entire data set is divided into as many ranges as there are AMPs 116. No partitioning means that a single AMP 116 manages all of the records.

Generally, the PDEs 112, PEs 114, and AMPs 116 are tangibly embodied in and/or accessible from a device, media, carrier, or signal, such as RAM, ROM, one or more of the DSUs 106, and/or a remote system or device communicating with the computer system 100 via one or more of the DCUs 108. The PDEs 112, PEs 114, and AMPs 116 each comprise logic and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Virtual Join Index

In the present invention, a standard join index is extended to new structures, known as a virtual join index and associated covering non-unique secondary indexes. The virtual join index stores the results from one or more join operations on one or more columns of one or more tables. The covering non-unique secondary indexes are generated by combining one or more commonly-used columns of the virtual join index. Data stored in the virtual join index is discarded and not maintained after the covering non-unique secondary indexes are generated. The data stored in the covering non-unique secondary indexes can then be used to satisfy a subsequent query, rather than having to perform the join operations from columns of the tables referenced in the query.

FIG. 2A illustrates the structures of two base tables (CUSTOMER_TABLE 200 and ORDER_TABLE 202), a virtual join index (VIRTUAL_JOIN_INDEX 204), and two non-unique secondary indexes (NUSI1 206 and NUSI2 208).

The base tables 200 and 202 are created using the following SQL statements:

```
CREATE TABLE CUSTOMER_TABLE(
    CUSTKEY INTEGER NOT NULL,
    NAME CHAR(26) CASESPECIFIC NOT NULL,
    ADDRESS VARCHAR(41),
    STATE VARCHAR(2),
UNIQUE PRIMARY INDEX(CUSTKEY);
CREATE TABLE ORDER_TABLE(
    ORDERKEY INTEGER NOT NULL,
    ORDERSTATUS CHAR(1) CASESPECIFIC,
    ORDERDATE DATE FORMAT 'YYYY-MM-DD' NOT NULL,
    PRICE DECIMAL(13,2) NOT NULL,
    CUSTKEY INTEGER,
UNIQUE PRIMARY INDEX(ORDERKEY);
```

A simple query comprising a SELECT statement can be defined on the base tables 200 and 202, wherein the query performs a join operation:

```
SELECT NAME, ORDERDATE
FROM ORDER_TABLE, CUSTOMER_TABLE
WHERE ORDER_TABLE.CUSTKEY=CUSTOMER_TABLE.CUSTKEY
  AND ORDERDATE>DATE '01-01-2000'
  AND ORDERDATE<DATE '03-01-2000';
```

Without a virtual join index 204, a typical execution plan for this query would involve redistributing ORDER_TABLE 202 into a spool file, sorting the spool file on CUSTKEY, and then performing a merge join between the spool file and the CUSTOMER_TABLE 200.

In the preferred embodiment, however, a virtual join index 204, as well as two NUSIs 206 and 208, can be defined as follows:

```
CREATE JOIN INDEX VIRTUAL_JOIN_INDEX, NO PRIMARY AS
    SELECT ORDER_TABLE.CUSTKEY,
        CUSTOMER_TABLE.NAME,
        ORDER_TABLE.ORDERSTATUS,
        ORDER_TABLE.ORDERDATE
    FROM ORDER_TABLE, CUSTOMER_TABLE
    WHERE ORDER_TABLE.CUSTKEY = CUSTOMER_TABLE.CUSTKEY
INDEX NUSI1 (ORDER_TABLE.CUSTKEY, ORDERSTATUS)
    ORDER BY (ORDER_TABLE.CUSTKEY),
INDEX NUSI2 (NAME, ORDERDATE)
    ORDER BY (ORDERDATE);
```

The NUSIs 206 and 208 are maintained as separate subtables. Each entry in the NUSIs 206 and 208 includes the specified column values, as well as row identifiers (or other pointers) to the rows in the tables 200 and 202 with those same column values. Thereafter, queries can scan one or more of the NUSIs 206 and 208 defined on the virtual join index 204, when at least a portion of the query can be satisfied by the NUSIs 206 and 208.

For example, an execution plan for the above SELECT statement may scans the NUSI 208 defined on the virtual join index 204, in a manner similar to that shown in the following statement:

```
SELECT NAME, ORDERDATE
FROM NUSI2
WHERE ORDERDATE>DATE '01-01-2000' AND
    ORDERDATE<DATE '03-01-2000';
```

The ability to access the NUSIs 206 and 208 rather than the tables 200 and 202 provides performance benefits in much the same manner as regular join indexes. However, the maintenance costs are less. That is, the benefits of the NUSIs 206 and 208 on the virtual join index 204 are obtained without the overhead of maintaining the data of the virtual join index 204.

The NUSIs 206 and 208 are defined on the virtual join index 204, and are automatically maintained by the system when updates (UPDATE, DELETE, INSERT) are performed on the underlying tables 200 and 202. In the preferred embodiment, additional steps are included in the execution plans for these updates to regenerate the affected portions of the NUSIs 206 and 208.

Also in the preferred embodiment, the user may specify the option of compressing the rows of the NUSIs 206 and 208 by defining a fixed subset of columns with a repeating set of columns. A compressed NUSI 206 or 208 may use less storage, and as such, may take less time to scan, thereby leading to improved performance.

Figure 2B:
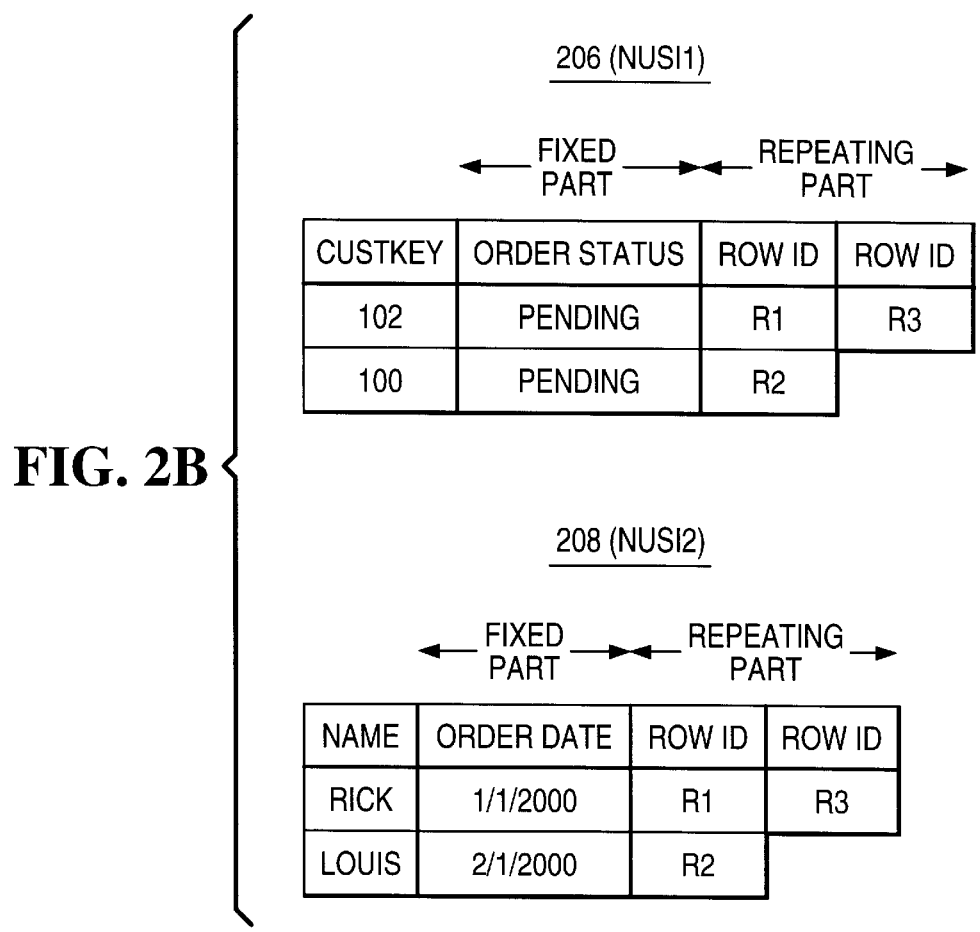

FIG. 2B illustrates NUSIs 206 and 208 using a novel structure to store the same information as in FIG. 2A This novel structure avoids redundant information, because each row contains two parts: a fixed part and a repeating part. The fixed part is stored only once, but the repeating part is comprised of recursive levels, so that it may contain as many values as needed. Each of the repeating parts may themselves contain two parts: a fixed and a repeating part.

The storage of a compressed row is described below (F1, . . . , FN)((FX, . . . , FY, ROWID), (FX, . . . , FY, ROWID), . . . ) wherein the fixed part (F1, . . . , FN) is referred to as FIELD 1, and the repeating part ((FX, . . . , FY, ROWID), (FX, . . . , FY, ROWID), . . . ) is referred to as FIELD 2.

For example, a row in the NUSI 206 or 208 with no recursive levels is defined as:

(F1)((R11), (R12), (R13), . . . )

where Fx indicates the fixed portion and Rxx indicates the repeating portions.

Similarly, a row in the NUSI 206 or 208 with one recursive level is defined as:

(F1)((F12, (R121, R122, . . . )), (F13, (R131, R132, R133, . . . )), . . . )

where Fx and Fxx indicate the fixed portions and Rxxx indicates the repeating portion.

In this novel structure, all rows resulting from the join operation that creates the NUSIs 206 or 208 having the same outermost fixed part are collapsed and stored into one row in the NUSIs 206 or 208, wherein a repeating field is added for each joined row.

In the example of FIGS. 2A and 2B, there are two rows in ORDER_TABLE 202 for the CUSTKEY=102, with NAME="RICK", in the CUSTOMER_TABLE 200, which results in the first row in both the NUSIs 206 and 208 of FIG. 2B. Note that even though a total of two rows exist in ORDER_TABLE 202, only one row exists in either NUSIs 206 or 208 of FIG. 2B, and the information about each customer is stored only once. The effect of this structure is that the NUSIs 206 and 208 can perform like denormalized tables (no join operations are needed), but the space required is equivalent to that of normalized tables.

CREATE/DROP JOIN INDEX Statement

In the preferred embodiment, a virtual join index with one or more NUSIs is created using the following SQL statement:

```
<create-join-index-stmt>::=
    CREATE JOIN INDEX <join-index-name>
    [, NO PRIMARY]
    AS SELECT <join-index-field-list>
    FROM <from-list>[WHERE <search-condition>]
    [ORDER BY <order-spec-list>]
    [<index-list>]
```

The following rules apply to the above statement:

The option NO PRIMARY indicates that the join index is a virtual join index.

A virtual join index should have one or more non-unique secondary indexes (NUSIs) and data is retrieved from one of the NUSIs instead of the primary table to satisfy queries that can use the virtual join index (that is, the NUSI must be a covering index for the query).

The virtual join index must be defined with primary-to-foreign key join conditions.

A compressed NUSI contains a fixed part (FIELD 1) and a repeating part (FIELD 2). The fixed part (FIELD 1) is defined by <column-name-list1>. The repeating part (FIELD 2) is defined by <column-name-list2>.

If a column is specified for the ORDER BY clause, it must be a column within <column-name-list1>.

This compressed format is beneficial when more than one NUSI row has the same content of the FIELD 1. These rows are stored in one physical row and the common value of the FIELD 1 is stored only once. The bigger the size of the FIELD 1 compared to the size of the FIELD 2 and the more rows with the same value in the FIELD 1, the more benefits derived from this format.

Of course, those skilled in the art will recognize that other statements may be used without departing from the scope of the present invention.

LOGIC OF THE RELATIONAL DATABASE MANAGEMENT SYSTEM

Figure 3:
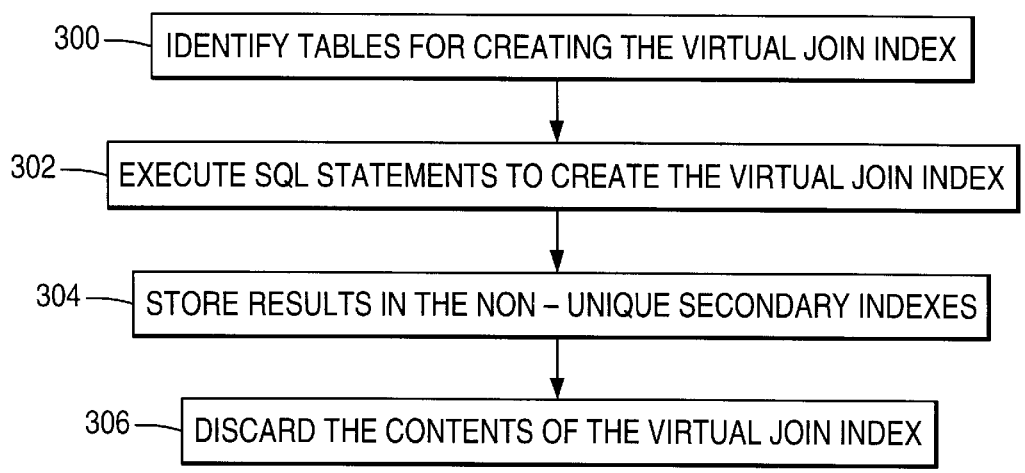
FIG. 3 is a flowchart illustrating the steps necessary for the creation of the virtual join index and associated covering non-unique secondary indexes according to the preferred embodiment of the present invention.
Figure 4:
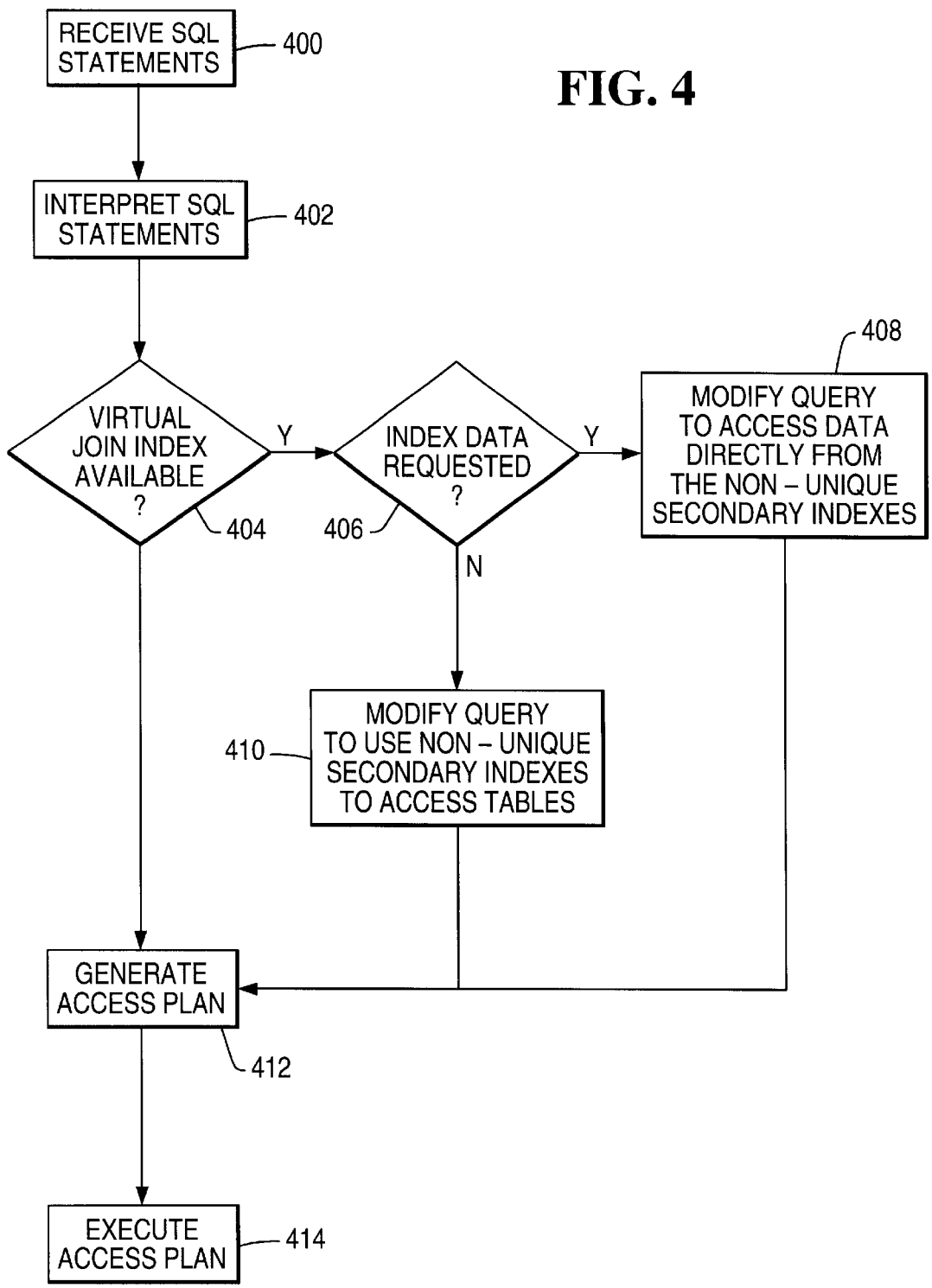
FIG. 4 is a flowchart illustrating the steps necessary for the use of the virtual join index and associated covering non-unique secondary indexes according to the preferred embodiment of the present invention.

Flowcharts which illustrate the logic of the RDBMS creating and using a virtual join index according to the present invention are shown in FIGS. 3 and 4. Those skilled in the art will recognize that this logic is provided for illustrative purposes only and that different logic may be used to accomplish the same results.

Creating The Virtual Join Index

FIG. 3 is a flowchart illustrating the steps performed by the RDBMS to create a virtual join index according to the present invention.

Block 300 represents the RDBMS identifying the tables from which to create the virtual join index.

Block 302 represents the RDBMS performing one or more SQL statements to create the virtual join index and generate the associated covering NUSIs, wherein the query comprises, for example, the following:

```
CREATE JOIN INDEX <VIRTUAL JOIN INDEX>, NO PRIMARY
AS SELECT <COLUMNS>
FROM <TABLES>
WHERE <SEARCH-CONDITION>
INDEX <NON-UNIQUE SECONDARY INDEX>
    ORDER BY (<COLUMNS>,
```

Those skilled in the art will recognize that other tables and other joins may be substituted for those indicated above.

Block 304 represents the RDBMS storing the results of the executed SQL statement in the associated covering NUSIs of the virtual join index for later use.

Finally, Block 306 represents the RDBMS discarding the data in the virtual join index. In alternative embodiments, the data may not have been materialized in the virtual join index, and this step would not be required.

Accessing Data Using The Virtual Join Index

FIG. 4 is a flowchart illustrating the steps performed by the RDBMS to use a virtual join index for accessing data according to the present invention.

Block 400 represents the RDBMS receiving one or more SQL statements comprising, for example, a query against one or more tables in the relational database.

Block 402 represents the RDBMS interpreting the SQL statements.

Block 404 is a decision block that represents the RDBMS determining whether a virtual join index can be used to answer the SQL statements. If not, control transfers to Block 412, which represents the RDBMS performing standard processing for the SQL statements; otherwise, control transfers to Block 406.

Block 406 is a decision block that represents the RDBMS determining whether the SQL statements access only data that can be found in the associated covering NUSIs of the virtual join index. If so, control transfers to Block 408, which represents the RDBMS modifying the SQL statements to access data only from the associated covering NUSIs of the virtual join index, rather than the tables referenced in the query, otherwise, control transfers to Block 410, which represents the RDBMS modifying the SQL statements to retrieve data from the tables using the associated covering NUSIs of the virtual join index.

Block 412 represents the RDBMS generating an access plan that enables the RDBMS to access the data from the relational database.

Block 414 represents the RDBMS executing the plan, retrieving the results from the relational database, and then returning the results to the user or client application.

CONCLUSION

This concludes the description of the preferred embodiment of the invention. The following paragraph describes an alternative embodiment for accomplishing the same invention.

In one alternative embodiment, any type of computer, such as a mainframe, minicomputer, or personal computer, could be used to implement the present invention. In addition, any database management system (DBMS) that performs join operations or uses join indexes could benefit from the present invention.

In summary, the present invention discloses the optimized retrieval of data from a database in a computerized database management system using a virtual join index and associated covering non-unique secondary indexes. The virtual join index is created by combining one or more commonly-used columns of one or more tables. The covering non-unique secondary indexes are generating by combining one or more commonly-used columns of the virtual join index. Data stored in the virtual join index is discarded and not maintained after the covering non-unique secondary indexes are generated. Thereafter, some queries maybe resolved solely by accessing one or more of the covering non-unique secondary indexes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing retrieval of data from a database in a computerized database management system, comprising:

(a) creating a virtual join index for one or more tables in the database by combining one or more columns from the tables; and (b) generating one or more covering non-unique secondary indexes for the virtual join index, wherein each of the covering non-unique secondary indexes combines one or more commonly-used columns of the virtual join index, and data is not stored in the virtual join index after the covering non-unique secondary indexes are generated.

2. The method of claim 1 above, wherein at least a portion of a query can be resolved solely by accessing one or more of the covering non-unique secondary indexes.

3. The method of claim 2 above, wherein the covering non-unique secondary indexes are scanned to provide results for the query.

4. The method of claim 1 above, wherein the covering non-unique secondary indexes use a compressed format that reduces storage requirements and provides faster access to data stored therein.

5. The method of claim 4 above, wherein each row of the non-unique secondary index contains a fixed part and a repeating part.

6. The method of claim 5 above, wherein the fixed part comprises a fixed set of one or more columns.

7. The method of claim 5 above, wherein the repeating part comprises a repeating set of one or more columns.

8. The method of claim 5 above, wherein the fixed part is stored only once in each row, but the repeating part is comprised of recursive levels within each row, so that each row may contain as many repeating parts as needed.

9. The method of claim 8 above, wherein each of the repeating parts contains a fixed part and a repeating part.

10. The method of claim 1 above, further comprising creating the virtual join index by performing one or more join operations on the tables.

11. The method of claim 1 above, further comprising generating the covering non-unique secondary indexes by performing one or more join operations on the virtual join index.

12. A method of optimizing retrieval of data from a database in a computerized database management system, comprising:

(a) receiving a query into a computer, and (b) processing the query by accessing one or more covering non-unique secondary indexes generated from a virtual join index, wherein the virtual join index is created for one or more tables in the database by combining one or more columns from the tables, each of the covering non-unique secondary indexes is generated by combining one or more commonly-used columns of the virtual join index, and data is not stored in the virtual join index after the covering non-unique secondary indexes are generated.

13. The method of claim 12 above, wherein at least a portion of the query can be resolved solely by accessing one or more of the covering non-unique secondary indexes.

14. The method of claim 13 above, wherein the covering non-unique secondary indexes are scanned to provide results for the query.

15. The method of claim 12 above, wherein the covering non-unique secondary indexes use a compressed format that reduces storage requirements and provides faster access to data stored therein.

16. The method of claim 15 above, wherein each row of the non-unique secondary index contains a fixed part and a repeating part.

17. The method of claim 16 above, wherein the fixed part comprises a fixed set of one or more columns.

18. The method of claim 16 above, wherein the repeating part comprises a repeating set of one or more columns.

19. The method of claim 16 above, wherein the fixed part is stored only once in each row, but the repeating part is comprised of recursive levels within each row, so that each row may contain as many repeating parts as needed.

20. The method of claim 19 above, wherein each of the repeating parts contains a fixed part and a repeating part.

21. The method of claim 12 above, further comprising creating the virtual join index by performing one or more join operations on the tables.

22. The method of claim 12 above, further comprising generating the covering non-unique secondary indexes by performing one or more join operations on the virtual join index.

23. A computerized database management system, comprising:

(a) means for creating a virtual join index for one or more tables in a database by combining one or more columns from the tables; and (b) means for generating one or more covering non-unique secondary indexes for the virtual join index, wherein each of the covering non-unique secondary indexes combines one or more commonly-used columns of the virtual join index, and data is not stored in the virtual join index after the covering non-unique secondary indexes are generated.

24. The system of claim 23 above, wherein at least a portion of a query can be resolved solely by accessing one or more of the covering non-unique secondary indexes.

25. The system of claim 24 above, wherein the covering non-unique secondary indexes are scanned to provide results for the query.

26. The system of claim 23 above, wherein the covering non-unique secondary indexes use a compressed format that reduces storage requirements and provides faster access to data stored therein.

27. The system of claim 26 above, wherein each row of the non-unique secondary index contains a fixed part and a repeating part.

28. The system of claim 27 above, wherein the fixed par comprise s a fixed set of one or more columns.

29. The system of claim 27 above, wherein the repeating part comprises a repeating set of one or more columns.

30. The system of claim 27 above, wherein the fixed part is stored only once in each row, but the repeating part is comprised of recursive levels within each row, so that each row may contain as many repeating parts as needed.

31. The system of claim 30 above, wherein each of the repeating parts contains a fixed part and a repeating part.

32. The system of claim 23 above, further comprising means for creating the virtual join index by performing one or more join operations on the tables.

33. The system of claim 23 above, further comprising means for generating the covering non-unique secondary indexes by performing one or more join operations on the virtual join index.

34. A computerized database management system, comprising:
   (a) means for receiving a query, and
   (b) means for processing the query by accessing one or more covering non-unique secondary indexes generated from a virtual join index, wherein the virtual join index is created for one or more tables in the database by combining one or more columns from the tables, each of the covering non-unique secondary indexes is generated by combining one or more commonly-used columns of the virtual join index, and data is not stored in the virtual join index after the covering non-unique secondary indexes are generated.

35. The system of claim 34 above, wherein at least a portion of the query can be resolved solely by accessing one or more of the covering non-unique secondary indexes.

36. The system of claim 35 above, wherein the covering non-unique secondary indexes are scanned to provide results for the query.

37. The system of claim 34 above, wherein the covering non-unique secondary indexes use a compressed format that reduces storage requirements and provides faster access to data stored therein.

38. The system of claim 37 above, wherein each row of the non-unique secondary index contains a fixed part and a repeating part.

39. The system of claim 38 above, wherein the fixed part comprises a fixed set of one or more columns.

40. The system of claim 38 above, wherein the repeating part comprises a repeating set of one or more columns.

41. The system of claim 38 above, wherein the fixed part is stored only once in each row, but the repeating part is comprised of recursive levels within each row, so that each row may contain as many repeating parts as needed.

42. The system of claim 41 above, wherein each of the repeating parts contains a fixed part and a repeating part.

43. The system of claim 34 above, further comprising means for creating the virtual join index by performing one or more join operations on the tables.

44. The system of claim 34 above, further comprising means for generating the covering non-unique secondary indexes by performing one or more join operations on the virtual join index.

45. An article of manufacture embodying logic for optimizing retrieval of data from a database in a computerized database management system, the logic comprising:
   (a) creating a virtual join index for one or more tables in the database by combining one or more columns from the tables; and
   (b) generating one or more covering non-unique secondary indexes for the virtual join index, wherein each of the covering non-unique secondary indexes combines one or more commonly-used columns of the virtual join index, and data is not stored in the virtual join index after the covering non-unique secondary indexes are generated.

46. The article of manufacture of claim 45 above, wherein at least a portion of a query can be resolved solely by accessing one or more of the covering non-unique secondary indexes.

47. The article of manufacture of claim 46 above, wherein the covering non-unique secondary indexes are scanned to provide results for the query.

48. The article of manufacture of claim 45 above, wherein the covering non-unique secondary indexes use a compressed format that reduces storage requirements and provides faster access to data stored therein.

49. The article of manufacture of claim 48 above, wherein each row of the non-unique secondary index contains a fixed part and a repeating part.

50. The article of manufacture of claim 49 above, wherein the fixed part comprises a fixed set of one or more columns.

51. The article of manufacture of claim 49 above, wherein the repeating part comprises a repeating set of one or more columns.

52. The article of manufacture of claim 49 above, wherein the fixed part is stored only once in each row, but the repeating part is comprised of recursive levels within each row, so that each row may contain as many repeating parts as needed.

53. The article of manufacture of claim 52 above, wherein each of the repeating parts contains a fixed part and a repeating part.

54. The article of manufacture of claim 45 above, further comprising logic for creating the virtual join index by performing one or more join operations on the tables.

55. The article of manufacture of claim 45 above, further comprising logic for generating the covering non-unique secondary indexes by performing one or more join operations on the virtual join index.

56. An article of manufacture embodying logic for optimizing retrieval of data from a database in a computerized database management system, the logic comprising:
   (a) receiving a query into a computer, and
   (b) processing the query by accessing one or more covering non-unique secondary indexes generated from a virtual join index, wherein the virtual join index is created for one or more tables in the database by combining one or more columns from the tables, each of the covering non-unique secondary indexes is generated by combining one or more commonly-used columns of the virtual join index, and data is not stored in the virtual join index after the covering non-unique secondary indexes are generated.

57. The article of manufacture of claim 56 above, wherein at least a portion of the query can be resolved solely by accessing one or more of the covering non-unique secondary indexes.

58. The article of manufacture of claim 56 above, wherein the covering non-unique secondary indexes are scanned to provide results for the query.

59. The article of manufacture of claim 56 above, wherein the covering non-unique secondary indexes use a compressed format that reduces storage requirements and provides faster access to data stored therein.

60. The article of manufacture of claim 59 above, wherein each row of the non-unique secondary index contains a fixed part and a repeating part.

61. The article of manufacture of claim 60 above, wherein the fixed part comprises a fixed set of one or more columns.

62. The article of manufacture of claim 60 above, wherein the repeating part comprises a repeating set of one or more columns.

63. The article of manufacture of claim 60 above, wherein the fixed part is stored only once in each row, but the repeating part is comprised of recursive levels within each row, so that each row may contain as many repeating parts as needed.

64. The article of manufacture of claim 63 above, wherein each of the repeating parts contains a fixed part and a repeating part.

65. The article of manufacture of claim 56 above, further comprising logic for creating the virtual join index by performing one or more join operations on the tables.

66. The article of manufacture of claim 56 above, further comprising logic for generating the covering non-unique secondary indexes by performing one or more join operations on the virtual join index.

67. A data structure stored in a memory for use by a database management system executed by a computer, the data structure comprising a non-unique secondary index generated from a virtual join index, wherein the virtual join index is created for one or more tables in the database by combining one or more columns from the tables, the covering non-unique secondary index is generated by combining one or more commonly used columns of the virtual join index, and data is not stored in the virtual join index after the covering non-unique secondary index is generated.

68. The data structure of claim 67 above, wherein at least a portion of a query can be resolved solely by accessing the covering non-unique secondary indexes.

69. The data structure of claim 68 above, wherein the covering non-unique secondary index is scanned to provide results for the query.

70. The data structure of claim 67 above, wherein the covering non-unique secondary index uses a compressed format that reduces storage requirements and provides faster access to data stored therein.

71. The data structure of claim 70 above, wherein each row of the non-unique secondary index contains a fixed part and a repeating part.

72. The data structure of claim 71 above, wherein the fixed part comprises a fixed set of one or more columns.

73. The data structure of claim 71 above, wherein the, repeating part comprises a repeating set of one or more columns.

74. The data structure of claim 71 above, wherein the fixed part is stored only once in each row, but the repeating part is comprised of recursive levels within each row, so that each row may contain as many repeating parts as needed.

75. The data structure of claim 74 above, wherein each of the repeating parts contains a fixed part and a repeating part.

76. The data structure of claim 67 above, wherein the virtual join index is created by performing one or more join operations on the tables.

77. The data structure of claim 67 above, wherein the coveting non-unique secondary index is generated by performing one or more join operations on the virtual join index.

* * * * *

UNITED STATES PATENT AND TRADEMARK OFFICE
CERTIFICATE OF CORRECTION

PATENT NO. : 6,505,188 B1
DATED : January 7, 2003
INVENTOR(S) : Ghazal, A., Sinclair, P. and Hoang, C. K.

It is certified that error appears in the above-identified patent and that said Letters Patent is hereby corrected as shown below:

Column 10,
Line 59, after "fixed" delete "par" and insert -- part --
Line 60, delete "compris s" and insert -- comprises --

Signed and Sealed this

Twenty-first Day of December, 2004

JON W. DUDAS
*Director of the United States Patent and Trademark Office*